United States Patent
Suzuki

(10) Patent No.: US 12,555,601 B2
(45) Date of Patent: Feb. 17, 2026

(54) MAGNETIC RECORDING DISK WITH HIGH INTERNAL STRESS TO REDUCE DISK DEFLECTIONS FROM SHOCK FORCES AND METHODS FOR USE WITH THE DISK

(71) Applicant: Western Digital Technologies, Inc., San Jose, CA (US)

(72) Inventor: Shoji Suzuki, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 387 days.

(21) Appl. No.: 17/492,450

(22) Filed: Oct. 1, 2021

(65) Prior Publication Data

US 2023/0110894 A1 Apr. 13, 2023

(51) Int. Cl.
*G11B 5/66* (2006.01)
*G11B 5/012* (2006.01)
(Continued)

(52) U.S. Cl.
CPC .............. *G11B 5/66* (2013.01); *G11B 5/012* (2013.01); *G11B 5/73919* (2019.05); *G11B 5/73921* (2019.05); *G11B 5/8404* (2013.01)

(58) Field of Classification Search
USPC ............ 428/846, 846.1, 846.4, 846.6, 846.7, 428/846.9, 848, 848.8
See application file for complete search history.

(56) References Cited

U.S. PATENT DOCUMENTS 6,063,470 A * 5/2000 Zou .................... G11B 5/84
428/64.2
6,180,201 B1 1/2001 Sandstrom
(Continued)

FOREIGN PATENT DOCUMENTS

CN 1340181 A 3/2002
CN 102737649 A 10/2012

OTHER PUBLICATIONS

Kim, Woochul, et al. "Optimal disk clamp design to minimize stress variation of disks in a hard disk drive." Journal of Mechanical Science and Technology, vol. 23, No. 10, Oct. 2009, pp. 2645-2651.*

(Continued)

*Primary Examiner* — Holly Rickman
*Assistant Examiner* — Lisa Chau
(74) *Attorney, Agent, or Firm* — LOZA & LOZA, LLP; Gabriel Fitch

(57) ABSTRACT

Disks for use in hard disk drives (HDD) or other magnetic recording apparatus. The disks are configured based on a finding that internal stress within a disk can make the disk more resistant to shock forces. In one example, a disk is provided that has a substrate with a thickness of no more than 0.5 millimeters and an internal stress no less than 300 megapascals. The relatively high internal stress within the substrate of the disk serves to reduce the magnitude of deflections caused by mechanical shocks to an HDD in which the disk is installed, as compared to other disks of equal thickness but with relatively less internal stress. Multi-platter stacks of the disks are described. Methods are also described for fabricating such disks and for rejecting disks that do not meet certain internal stress-based criteria. Substrates are also described.

13 Claims, 15 Drawing Sheets

(51) Int. Cl.
    *G11B 5/73*           (2006.01)
    *G11B 5/84*           (2006.01)

(56)                 References Cited

U.S. PATENT DOCUMENTS

| | | |
|---|---|---|
| 6,381,092 B1 * | 4/2002 | Suzuki ................. G11B 17/038 |
| 8,111,481 B2 | 2/2012 | Nigam et al. |
| 9,242,888 B2 | 1/2016 | Isono et al. |
| 9,449,633 B1 | 9/2016 | Pirzada et al. |
| 10,535,366 B2 | 1/2020 | Tamaki et al. |
| 2003/0108776 A1 | 6/2003 | Chang et al. |
| 2003/0211361 A1 * | 11/2003 | Kim .................... G11B 5/7368 |
| | | 428/832 |
| 2006/0232880 A1 | 10/2006 | Xu et al. |
| 2008/0055773 A1 | 3/2008 | Nigam |
| 2021/0090601 A1 | 3/2021 | Suzuki et al. |

OTHER PUBLICATIONS

Kim, Woochul et al., "Optimal disk clamp design to minimize stress variation of disks in a hard disk drive"; Journal of Mechanical Science and Technology; Oct. 14, 2009; pp. 2645-2651; https://doi.org/10.1007/s12206-009-0717-5.

Pini, Valerio et al., "How two-dimensional bending can extraordinarily stiffen thin sheets"; Scientific Reports; Jul. 11, 2016; https://doi.org/10.1038/srep29627; 7 pages.

Shi, S., et al., "Low stress macroscopic plastic behavior of coated part under repeated impact contact load", Chinese Journal of Mechanical Engineering, vol. 41, No. 4, pp. 1-6, (Apr. 2005).

* cited by examiner

1600

Substrate having (a) a thickness no more than a thickness threshold and having an internal stress no less than a stress threshold, wherein the stress threshold divided by the thickness threshold squared is equal to a predetermined ratio in the range of 0.96 gigapascals (GPa) per $mm^2$ to 1.44 GPa per $mm^2$ (i.e., 1.2 GPa per $mm^2$ ± 20%) and/or the substrate having (b) a thickness less than or equal to 0.5 millimeters (mm) and an internal stress greater than or equal to 300 megapascals (MPa)

*FIG. 16*

MAGNETIC RECORDING DISK WITH HIGH INTERNAL STRESS TO REDUCE DISK DEFLECTIONS FROM SHOCK FORCES AND METHODS FOR USE WITH THE DISK

FIELD

The present disclosure relates to a magnetic recording disks and methods for fabrication of such disk, and more particularly to disks for use in a multi-platter hard disk drive (HDD) recording apparatus.

INTRODUCTION

Magnetic storage devices such as hard drive disks (HDDs) are storage devices that store data or information magnetically. High capacity HDDs often use multiple disks to store data (e.g., a multi-platter HDD). A multi-platter HDD may employ very thin disks. Within HDDs using such disks, disk deflections due to mechanical shocks to the HDD may exceed a gap between an outer edge of the disk and a load-unload ramp of the HDD, causing damage. As a practical matter, disk thickness cannot be easily increased since the size of the overall HDD needs to be meet certain specifications to fit within host devices or other housings or enclosures (e.g., a one inch HDD chassis). Therefore, other methods or techniques are needed to ensure that the disk is sufficiently rigid to withstand the mechanical shocks.

SUMMARY

In one aspect, a disk for a magnetic recording apparatus is provided. The disk includes a substrate having a thickness less than or equal to 0.5 millimeters (mm) and an internal stress greater than or equal to 300 megapascals (MPa); and a magnetic recording layer on the substrate.

In another aspect, a disk for a magnetic recording apparatus is provided, wherein the disk includes a substrate having a thickness less than or equal to a thickness threshold and having an internal stress greater than or equal to a stress threshold, wherein the stress threshold divided by the thickness threshold squared is equal to a predetermined ratio, and wherein the predetermined ratio is in the range of 0.96 to 1.44 gigapascals (GPa) per millimeter squared ($mm^2$). A magnetic recording layer is disposed on the substrate.

In another aspect, a data storage device is provided. The data storage device includes a plurality of stacked recording disks. Each recording disk includes: a substrate having a thickness less than or equal to 0.5 mm and an internal stress greater than or equal to 300 MPa; and a magnetic recording layer configured to store information. The data storage device also includes: at least one spacer between each adjacent recording disk in the plurality of stacked recording disks; and a clamping mechanism configured to clamp the plurality of stacked recording disks and the spacers together.

In yet another aspect, a method for providing a disk for a magnetic recording apparatus data storage device is provided. The method includes selecting a substrate having a thickness less than or equal to a thickness threshold and having an internal stress greater than or equal to a stress threshold, wherein the stress threshold divided by the thickness threshold squared is equal to a predetermined ratio in the range of 0.96 to 1.44 GPa per $mm^2$. The method also includes forming a magnetic recording layer on the substrate.

In still another aspect, a substrate is provided for use in a magnetic recording apparatus, the substrate having a thickness less than or equal to a thickness threshold and having an internal stress greater than or equal to a stress threshold, wherein the stress threshold divided by the thickness threshold squared is equal to a predetermined ratio in the range of 0.96 to 1.44 GPa per $mm^2$.

BRIEF DESCRIPTION OF THE DRAWINGS

FIG. 16 illustrates an exemplary substrate for use in a magnetic recording apparatus in accordance with an embodiment of the disclosure.

DETAILED DESCRIPTION

Figure 1:
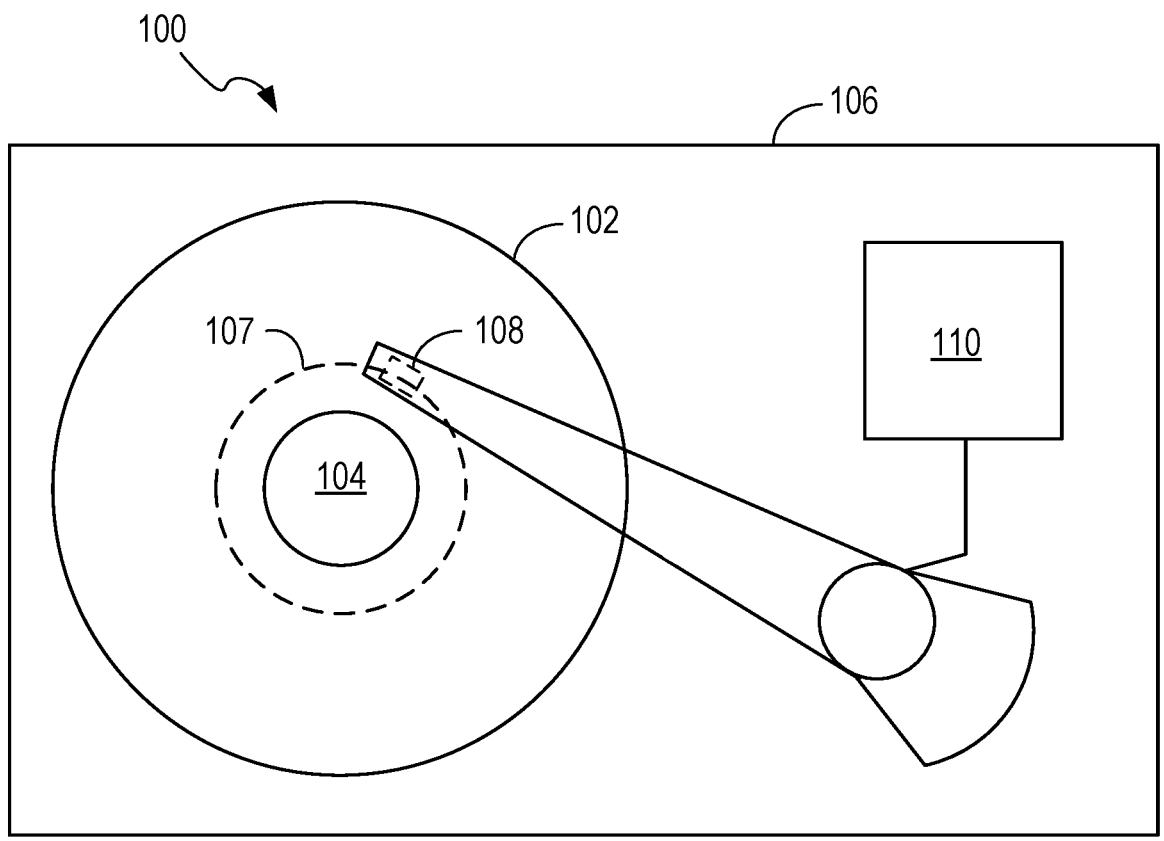
FIG. 1 illustrates a top plan view of a disk drive in accordance with an embodiment of the disclosure.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Disk rigidity and disk flatness deviation (or disk flatness) may be important properties of a magnetic recording disk for use in an HDD, and providing a disk with sufficient amount of disk rigidity may be important. Sufficient disk rigidity helps ensure that the disk does not vibrate too much during operation (e.g., during spinning). The higher the disk rigidity, the lower the disk vibration. An acceptable disk flatness means there are no significant topographical variations, which can adversely affect the head flying characteristics. A maximum flatness deviation helps ensure that there is not too much variation between the highest point of the disk and its lowest point. Too much flatness deviation may cause the slider (e.g., drive component positioned near the disk to access information stored on the disk) to hit portions of the disk. Thus, in some aspects, HDD disks should (a) satisfy a minimum disk rigidity and (b) the flatness deviation should be lower than a maximum allowable flatness deviation, at least after the disk has been clamped down in the HDD, as in multi-platter HDDs.

In some applications, a multi-platter HDD may require thin disks, each with a thickness of 0.5 millimeters (mm) for a 10 D form factor (e.g., 10 disks within a one inch chassis) and even thinner for 11 D or 12 D form factors. One challenging problem is to reduce disk deflections of thin disks that occur when mechanical shock forces act on the drive such as, e.g., during a hot swap or, more rarely, if the user drops the drive. (With a hot swap, some drives within a server chassis are operating while one drive is replaced. As such, any bumps to the server during the hot swap can impart shocks to the drives that are operating.) As explained above, disk deflections due to mechanical shocks may exceed a gap between the outer edge of the disk and a load-unload ramp of an HDD, causing damage and potentially preventing the HDD from operating. Thicker disks can have greater rigidity than thinner disks, but thicker disks are often not feasible given the form factor constraints, and so thin disks (e.g., disks with thickness ≤0.5 mm) may be needed. Because of the form factor constraints, there is not much room available within an HDD to reduce the risk of damage from disk deflections. Therefore, other methods are needed to ensure that the disk is sufficiently rigid.

Herein, disks for use in HDDs or other magnetic recording apparatus are described wherein the disks are configured based on a finding that internal stress within a disk can make the disk more resistant to shock forces. For example, disks with higher internal stress will exhibit smaller deflections in response to the same amount of mechanical shock (e.g., in response to the same G-force that may arise if the HDD is dropped by a user).

In one aspect, a disk is provided for a magnetic recording apparatus with the disk having a substrate with a thickness of no more than 0.5 mm and an internal stress no less than (i.e., greater than or equal to) 300 megapascals (MPa). The relatively high internal stress (≥ 300 MPa) within the substrate serves to reduce the magnitude of deflections caused by mechanical shocks to an HDD in which the disk is installed, as compared to other disks of equal thickness but with relatively less internal stress (<300 MPa).

In another aspect, a disk is provided where the disk includes a substrate having a (T) thickness no more than (i.e., less than or equal to) a thickness threshold ($T_{threshold}$) and having an internal stress (S) no less than a stress threshold ($S_{threshold}$). $T_{threshold}$ and $S_{threshold}$ are such that $S_{threshold}$ divided by $(T_{threshold})^2$ is equal to a predetermined ratio (R). In an illustrative example, R is 1.2 GPa/mm$^2$, $S_{threshold}$ is 300 MPa, $T_{threshold}$ is no more than 0.5 mm, and the internal stress is in the range of 300 MPa to 600 MPa. In another example where R is 1.2 GPa per mm$^2$, $S_{threshold}$ is 240 MPa and $T_{threshold}$ is no more than 0.45 mm, the internal stress is in the range of 240 MPa to 600 MPa. Thus, a thinner disk (e.g., 0.45 mm) can have an internal stress lower than the internal stress of a thicker disk (e.g., 0.5 mm), while still achieving satisfactory rigidity. Note that the ratio (R) is based on the stress being roughly proportional to the thickness squared and in other examples R may be in the range of 0.96 GPa per mm$^2$ to 1.44 GPa per mm$^2$, i.e., 1.2 GPa per mm$^2$±20%.

To provide a substrate having high internal stress (e.g., ≥300 MPa for a 0.5 mm disk), the substrate may be formed of glass and then subjected to temperatures of 600° Celsius (C) or more (e.g., during a deposition process used to deposit magnetic recording layers on the substrate). Alternatively, the substrate may be an aluminum-magnesium (Al—Mg) alloy with nickel-phosphorus (NiP) coating (plating) layers deposited on opposing surfaces. By selecting the thickness of the NiP coatings, high internal stress (e.g., ≥300 MPa for a 0.5 mm disk) may be achieved within the substrate. Note also that, for Al—Mg disks, internal stress can be added during the annealing process after NiP plating. The annealing temperature may be around 250° C. and the annealing duration about 10 to 30 minutes. If disk movement during the annealing process is limited, disk expansion can generate stress in the disks and some of the stress may remain after the annealing process.

Thin disks with high internal stress tend to deform or warp due to their high internal stress. For example, an outer diameter (OD) or perimeter of the disk may bend upwardly or downwardly during deposition of layers onto the substrate, resulting in a deformed concave or convex disk. That is, for a given disk thickness (at least for disks less than or equal to 0.5 mm), the deformation or deviation of the OD of the disk from a flat disk profile will likely be greater for a disk with high internal stress than for a similar disk with lower internal stress. In some aspects, the thin disks described herein have internal stress high enough so that the (un-clamped) OD deviation of the disk from a flat disk profile is greater than a predetermined flatness deviation threshold, such as 20 μm. Note that, herein, the term deviation generally refers to an inelastic deformation or warping of the disk that can occur, for example, during deposition of layers onto the substrate due to heat or other factors. The term deflection refers to a kinetic change in the shape of the disk caused by a mechanical shock to an HDD in which the disk is installed. Deflections may be temporary and elastic.

In an HDD, a clamping mechanism may be used to clamp the outer diameters of a stack of the deformed disks together (with spacers between adjacent disks in the stack) to secure the disks into a platter and also flatten the disks. The disks described herein may be referred to as pre-stressed disks, since the disks already have relatively high internal stress even before a clamping mechanism is applied to the disks. The disks may also be referred to as pre-warped disks since the high internal stress will warp the (unclamped) disks.

Internal stress can be added to a thin disk that is flat to begin with by applying a clamping force to the flat disk (or to a set of disks in a multi-platter HDD). However, if the internal stress within the disk is relatively low to begin with, the clamping force will add internal stress, but the disk will likely deform due to the externally-applied stress from the clamping mechanism (at least for thin disks, e.g., less than or equal to 0.5 mm), thus resulting in a clamped disk with poor flatness, which can hinder HDD performance. On the other hand, if the internal stress within the disk is relatively high to begin with (e.g., ≥300 MPa for a 0.5 mm disk) and the disk is already deformed, the clamping mechanism will not significantly increase the internal stress of the disk but will instead serve to flatten the disk while the disk retains is rigidity. (Note that thick disks often have sufficient rigidity by virtue of their thickness, regardless of their internal stress, and so the considerations described herein regarding internal stress may not present a practical issue for thicker disks (e.g., disks with thicknesses greater than 0.5 mm and, especially, greater than 1.0 mm)).

Hence, in some aspects, deformed (e.g., concave or convex) disks are intentionally provided where the deformation is due to the disks being thin and pre-stressed. This is done so that, when a clamping force is then applied to the disks in a multi-platter HDD, the disks tend to flatten out while retaining their high internal stress. The high internal stress allows the disks to retain high rigidity (even though the disks are thin) so as to resist OD deflections due to shock forces, yet the clamped disks are also sufficiently flat to provide good recording performance.

Accordingly, in some aspects, a data storage device is provided that includes a set of stacked recording disks, where each recording disk includes (a) a substrate having a thickness no more than 0.5 mm and an internal stress no less than 300 MPa and (b) a magnetic recording layer configured to store information. At least one spacer is provided between each adjacent recording disk in the set of stacked recording disks. A clamping mechanism is configured to clamp the set of stacked recording disks and the spacers together. In this manner, a multi-platter HDD may be provided wherein the disks are sufficiently rigid to resist OD deflections due to any shocks applied to the HDD while also providing disks that are sufficiently flat to provide for good HDD performance. As explained above, the thin disks may initially be deformed due to their high internal stress, but the clamping mechanism flattens out the disks, while the disks retain their internal stress to provide satisfactory rigidity. These and other features will be described in detail below.

Still further methods are providing for selecting acceptable disks for use in a HDD based, at least in part, on their internal stress, and for rejecting disks that do not meet certain internal stress-based criteria. The methods are also described in detail below.

Exemplary Disk Drive with Magnetic Recording Media with Pre-Stressed Disks

FIG. 1 is a top schematic view of a disk drive 100 configured for magnetic recording and including a magnetic recording medium 102 having pre-stressed disks in accordance aspects of the disclosure. In illustrative examples, the magnetic recording medium 102 includes a perpendicular magnetic recording (PMR) medium. However, other recording media, such shingle-written magnetic recording (SMR) media, heat assisted magnetic recording (HAMR) or microwave assisted magnetic recording (MAMR) media may be used in other examples. Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data is accomplished with the head/slider 108 that may have both read and write elements. The write element is used to alter the properties of the magnetic recording layer of disk 102 and thereby write information thereto. In one embodiment, recording head 108 may have magneto-resistive (MR), or giant magneto-resistive (GMR) elements, such as tunnel magneto-resistive (TMR) elements for reading, and a write pole with coils that can be energized for writing. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 2:
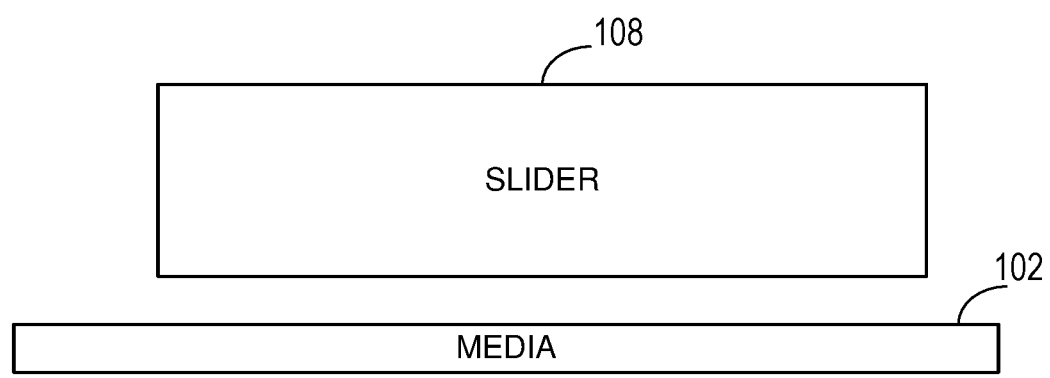
FIG. 2 illustrates a profile view of a slider and a disk in accordance with an embodiment of the disclosure.

FIG. 2 is a side cross sectional schematic view of selected components of the magnetic recording system of FIG. 1 including the magnetic recording medium 102 with pre-stressed disk in accordance with aspects of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media can be used in other suitable magnetic recording systems (e.g., such as SMR, and MAMR recording systems). For simplicity of description the various embodiments are primarily described in the context of an exemplary HDD magnetic recording system.

Figure 3:
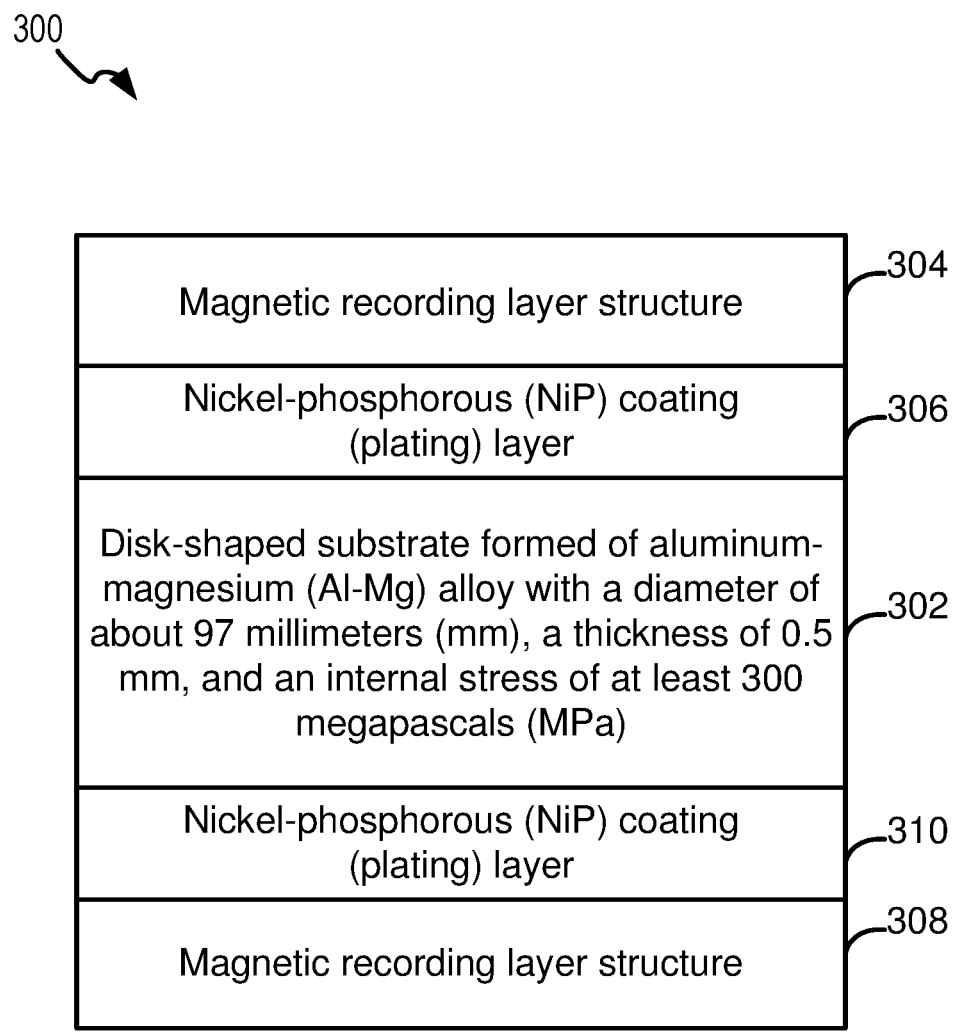
FIG. 3 illustrates an exemplary magnetic recording medium in the form of a pre-stressed disk having a substrate formed of aluminum-magnesium (Al—Mg) alloy in accordance with an embodiment of the disclosure.

FIG. 3 illustrates, in simplified form, an exemplary magnetic recording medium, platform or structure in the form of a pre-stressed disk 300 having a substrate 302 formed of Al—Mg alloy. A first magnetic recording layer structure 304 is deposited on one side (e.g., the top side) of the substrate 302 above an intervening NiP coating (plating) layer 306. A second magnetic recording layer structure 308 is deposited on the other side (e.g., the bottom side) of the substrate 302 below another intervening NiP coating (plating) layer 310. The NiP coatings are provided on the Al—Mg alloy substrate since an Al—Mg alloy substrate is not easy to polish. A NiP coating is amorphous and provides a smoother layer to allow for deposition of a magnetic recording layer structure. The NiP coating is also a very hard layer, which is beneficial. In some examples, a magnetic recording layer structure is deposited on only one side of the substrate and hence only one NiP coating is provided. The first and second magnetic recording layers (e.g., 304, 308) may include, e.g., cobalt-platinum (CoPt), iron-platinum (FePt) alloy, and/or combinations thereof. For clarity and simplicity, FIG. 3 only shows a few of the layers typically included in a recording medium. Other following figures such as FIGS. 4, 7, 10 and 11 similarly present simplified views with other layers omitted. Further details of an exemplary media structure may be found in U.S. patent application Ser. No. 17/361,272, now U.S. Pat. No. 11,735,217, entitled "HEAT ASSISTED MAGNETIC RECORDING MEDIA WITH AMORPHOUS MAGNETIC GRAIN BOUNDARY MATERIAL," filed on Jun. 28, 2021, and assigned to the assignee of the present application, and which is incorporated fully by reference herein.

Although not shown in FIG. 3, the magnetic recording layer structure 304 may include magnetic recording sub-layers and exchange control sub-layers (ECLs). Collectively, the sub-layers form a magnetic recording layer structure 304 that may be, e.g., 100-200 angstroms (Å) thick. Since both the NiP layers and the magnetic recording layer structure are both very thin (e.g., on the order of microns (μm) or Å, respectively), the thickness of the disk 300 is primarily the thickness of the substrate, e.g., 0.5 mm or less (and, e.g., in the range of 0.2 mm to 0.5 mm). In some examples, NiP thickness is 6 to 10 μm per side and the overall disk thickness (such as 0.5 mm or 0.34 mm) may be measured to include the NiP. Note that other coatings may be provided as well, which are also very thin and do not significantly add thickness. For example, protective layers may be deposited that include carbon, diamond-like crystal, carbon with hydrogen and/or nitrogen doping, and/or combinations thereof.

In some examples, the substrate 302 has a diameter (i.e., OD) of about 97 mm, a thickness of 0.5 mm, and an internal stress of at least 300 MPa. In other examples, the OD may be 98 mm or 98.1 mm. (Generally speaking, such disks are all referred to as "3.5 inch" disks.) As explained above, the relatively high internal stress within the substrate (≥300 MPa) serves to reduce the magnitude of OD deflections caused by mechanical shocks to an HDD in which the disk is installed, as compared to other disks of equal thickness but with relatively less internal stress (<300 MPa).

The pre-stressed disk 300 may be deformed due to its high internal stress into a convex or concave shape (shown in FIG. 5, described below) and have an un-clamped OD deviation that exceeds a predetermined flatness deviation threshold, such as an exemplary threshold of 20 μm. Once clamped with other disks in a multi-platter stack, the disk is flattened to have an OD deviation below the flatness deviation threshold, e.g., to an OD deviation 15 μm, which is below 20 μm. In some examples, the clamping force is applied to the stack using a set of screws. In one particular example, six screws are employed, each providing a torquing force of 40 centiNewton-meter (cNm) (or 0.04 Nm).

The thin NiP coating (plating) layers 306 and 310 may be applied to the substrate with a thickness in the range of, e.g., 6 μm to 30 μm. By applying NiP coatings to the substrate within that range of thickness, the NiP tends to pre-stress the substrate 302 to achieve the desired internal stress of at least 300 MPa for the 0.5 mm thick disk. The thickness of the two NiP coatings may differ. A selected amount of internal stress may be achieved by selecting the relative thicknesses of the NiP coatings.

For disks that have NiP coatings on opposing sides of a substrate (e.g., 306, 310), disk flatness deviations are primarily caused by a stress imbalance, which is proportional to a thickness imbalance (or thickness difference) in the coating layers. The greater the thickness difference between the coating layers, the higher the stress imbalance and hence the greater the internal stress in the substrate and the greater the disk flatness deviation in the disk. Conversely, the smaller the thickness difference between the coating layers, the lower the stress imbalance, and the lower the disk flatness deviation in the disk. The internal stress within the substrate is determined, at least in part, by the differences in thermal expansion rate (e.g., difference in coefficient of thermal expansion (CTE)) between the substrate 302 (e.g., Al—Mg material) and the coating layers (e.g., NiP) 306 and/or 310. Since the expansion rate of the coating layers (e.g., 306, 310) is less than the substrate 302, compressive stress usually arises within the substrate 302 leading to an increase in internal stress. In this manner, the amount of internal stress within a substrate can be controlled based on the thickness of the NiP coatings.

Although FIG. 3 illustrates an example where the substrate (and hence the disk) is about 0.5 mm, different implementations may use different thicknesses for a disk. In some implementations, the disk 300 may have a thickness in a range of 0.2 mm and 0.5 mm (e.g., 0.2 mm, 0.38 mm, or 0.5 mm). The Young's modulus (E) value for a substrate may be, e.g., in a range of 60-100 gigapascals (GPa) (e.g., 68 GPa, 95 GPa, or 60-80 GPa). Generally speaking, the rigidity of a disk depends on its thickness, the Young's modulus of the substrate material, the disk diameter, and other factors such as the media fabrication processes. In some implementations, in order to have enough rigidity, the first coating layer 306 and the second coating layer 310 may each have a thickness that is in a range of about 6 μm-30 μm but with a thickness difference between the two coatings that is at least 0.43 μm (for an E of 68 GPa) and a thickness difference between the two coatings that is at least 0.60 μm (for an E of 95 GPa). The thickness difference provides a stress imbalance that increases the internal stress of the substrate (and the disk itself) to a level sufficient raise the rigidity to an acceptable level. Note that a thickness imbalance as small as 0.1 μm can cause flatness deviations more than 20 μm on 97-0.5 mm disks (i.e. disks with OD of 97 mm and thickness of 0.5 mm.)

Figure 4:
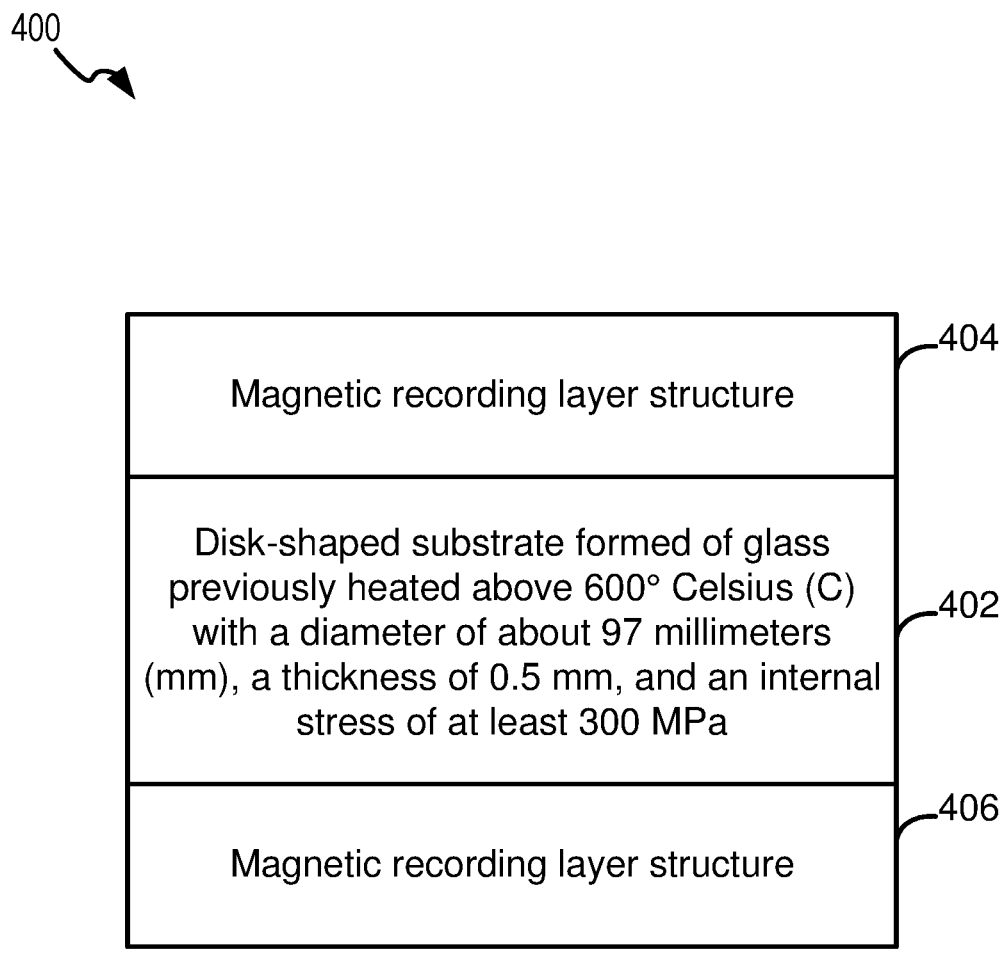
FIG. 4 illustrates an exemplary magnetic recording medium in the form of a pre-stressed disk having a substrate formed of glass in accordance with an embodiment of the disclosure.

FIG. 4 illustrates, in simplified form, an exemplary magnetic recording medium, platform or structure in the form of a pre-stressed disk 400 having a substrate 402 formed of glass. A first magnetic recording layer structure 404 is deposited on one side surface (e.g., the top surface) at a temperature of 600° C. or more. A second magnetic recording layer structure 406 is deposited on one side surface (e.g., the bottom surface) at a temperature of 600° C. or more. The substrate 402 has a diameter of about 97 mm, a thickness of 0.5 mm, and an internal stress of at least 300 MPa. By heating the glass substrate to 600° C. or more, the heat tends to pre-stress the glass substrate to the desired internal stress of at least 300 MPa. Note that internal stress on a glass substrate also can be generated during the sputtering process. Typical sputtering equipment uses a disk carrier that has pins to support the disk at OD perimeter so that the data surfaces are free of any obstruction during the deposition. The supporting pins tend to stress the disk into a warped convex or concave shape. Since deposited layers follow the general contour of disk surfaces, deposited layers have different stress levels. Consequently, the disk (once released from its carrier at the end of the process) has internal stress.

Although not shown in FIG. 4, the magnetic recording layer structure 404 may include magnetic recording sub-layers and ECLs that, collectively, may be, e.g., 100-200 Å thick. Since the magnetic recording layer structures 404 and 406 are very thin, the thickness of the disk 400 is primarily a function of the thickness of the substrate, i.e., 0.5 mm or less. Other coatings may be provided as well, which are also very thin and do not significantly add thickness. For example, an adhesion layer may be provided between the glass substrate and the magnetic recording layer structures. A NiP coating is typically not used for a glass substrate since the glass substrate can be polished to be very smooth, unlike the Al—Mg layers discussed above.

As with disk 300, disk 400 may be deformed due to its high internal stress into a convex or concave shape (shown in FIG. 5, described below) and have an un-clamped OD deviation that exceeds a predetermined flatness deviation threshold, such as an exemplary threshold of 20 μm. Once clamped with other disks in a multi-platter stack, the disk is flattened to have an OD deviation below the flatness deviation threshold, e.g., below 20 μm.

Figure 5:
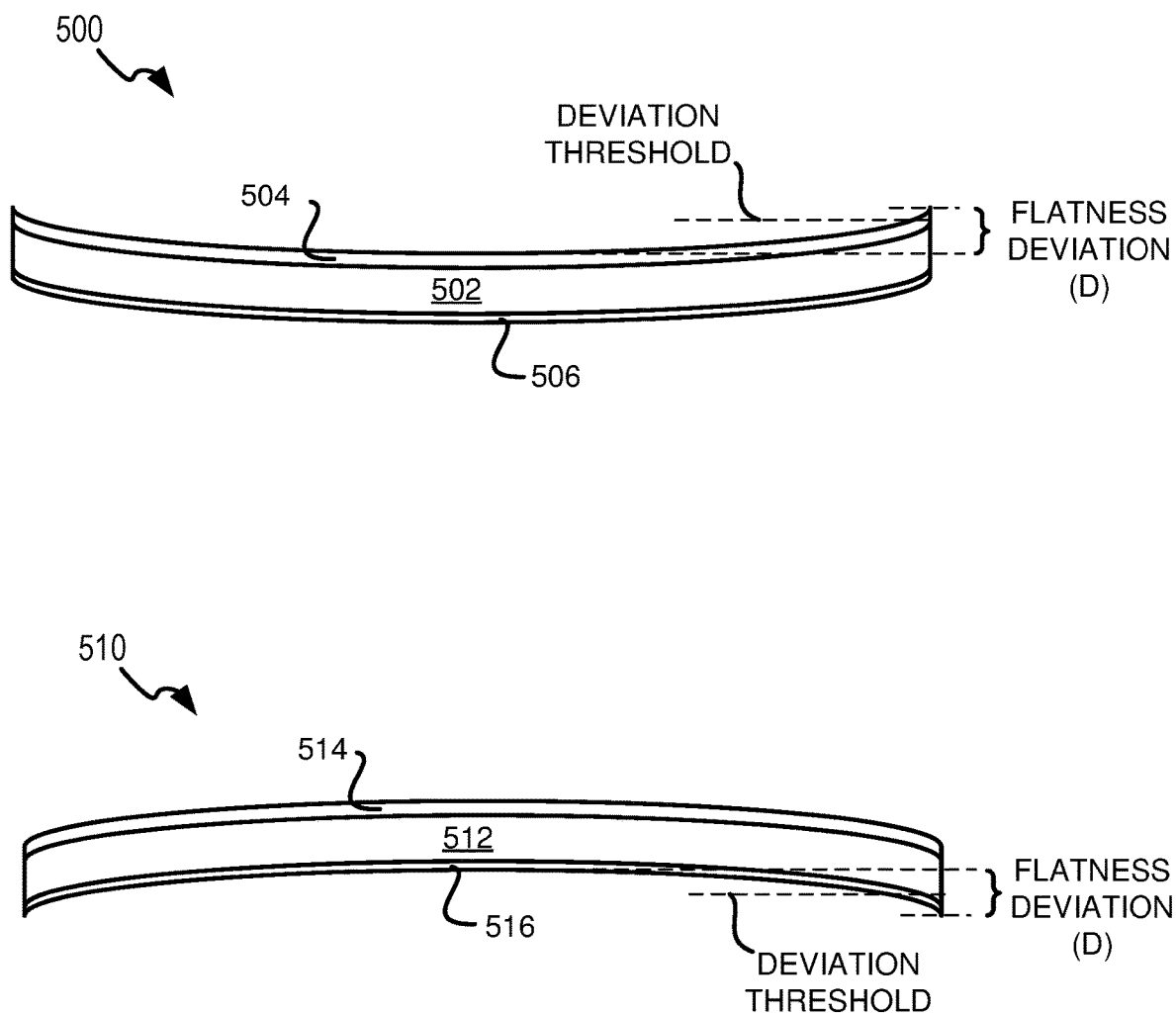
FIG. 5 illustrates profile views of a disk under high internal stress in accordance with an embodiment of the disclosure.

Turning now to FIG. 5, the warping or deformation of disks, such as disk 400 of FIG. 4, will be further described with reference to HAMR. HAMR is a magnetic storage technology for use in storage devices such as HDDs wherein magnetic storage material is temporarily heated during the writing of data, potentially allowing for significant increases in areal density of data as compared to other magnetic storage technologies, such as traditional perpendicular magnetic recording (PMR), helium-filled drives or shingled magnetic recording (SMR). A magnetic storage disk used for HAMR, such as disk 400, may have a glass-based substrate upon which various magnetic recording layers and other layers are deposited. If the deposition temperature, which may depend on the substrate glass material, and is often around 600° C., 700° C., or more, approaches a glass transition temperature, the viscosity of the glass may decrease exponentially causing a softening of the glass. The softening can lead to deformation of bulk material as flatness deviations or "creep." The deformation often gives a concave or convex shape to the substrate. The deviation from the flat surfaces can cause variations to magnetic signals applied to (or obtained from) the disk, especially to a servo track signal. This can reduce the track density capability and consequently lower capacity. In addition, the OD edges of such deformed or warped disks are closer to a load/unload ramp in the hard disk drive and can also reduce the shock performance.

Accordingly, it is desirable that the substrate be sufficiently flat (at least after clamping is applied) so the magnetic recording layers of the substrate can be well-suited for reliable high density data storage. Note that flatness is not necessarily a localized geometrical feature of a disk. The entire disk may have a concave, convex, saddle, or cylindrical shape. Such macroscopic variations can give an undesirable flying trajectory to a magnetic head/slider. A clearance between the OD edge of a disk and the load/unload ramp may also be compromised and thus reduce the tolerance to the shock events, where the OD edge moves due to the vibration and hits the ramp material. If this happens during device operation, the disk edge can generate wear debris and such can trigger a head crash and/or signal erasures. In some aspects, a flatness metric can be determined for the substrate that quantifies the aforementioned flatness deviations. In some examples, it is desirable that the glass-based substrate have a flatness metric (at least after clamping) that is low and, for example, below 20 μm. Note that surface flatness metrics are well-known and may represent, e.g., flatness in terms of deviations in a surface in microns from a perfectly flat surface, with a smaller flatness value representing a better or flatter surface and with a larger flatness value representing a poorer or more jagged or deformed surface.

FIG. 5 illustrates deformation of a disk 500 that can arise due to internal stress occurring within a HAMR glass substrate 502 during high temperature deposition (e.g., at temperatures of 600° C. or above) of magnetic recording layer structures 504 and 506 onto the top and bottom surfaces of the substrate 502, respectively. The internal stress generated within the substrate 502 causes the disk 500 to have an OD flatness deviation (D), wherein D may exceed a threshold set, e.g., to 20 μm. In some cases, as shown by way of disk 500, a top surface of the disk deforms into a concave shape. In other cases, as shown by way of disk 510, the top surface of the disk deforms into a convex shape. Other forms (shapes) of deformation may occur as well. As explained above, it is generally considered undesirable to have flatness deviations that are large (e.g., greater than 20 μm). However, when using the pre-stressed disks described herein, a high un-clamped flatness deviation (e.g., greater than 20 μm) is not considered problematic and indeed may be beneficial. Once the disk is clamped with other disks in a multi-platter stack, the deformed disk is flattened to have an OD deviation below the threshold, e.g., below 20 μm, while retaining its high internal stress and hence rigidity so as to resist large OD deflections causes by mechanical shocks. Furthermore, each individual disk in the platter will likely have different un-clamped deformations, which will tend to average out when numerous disks (e.g., ten) are stacked. Hence, in some aspects, a multi-platter stack is provided having at least ten disks so that the variation in deformations among the disks tends to average out over the stack of disks when clamped.

Figure 6:
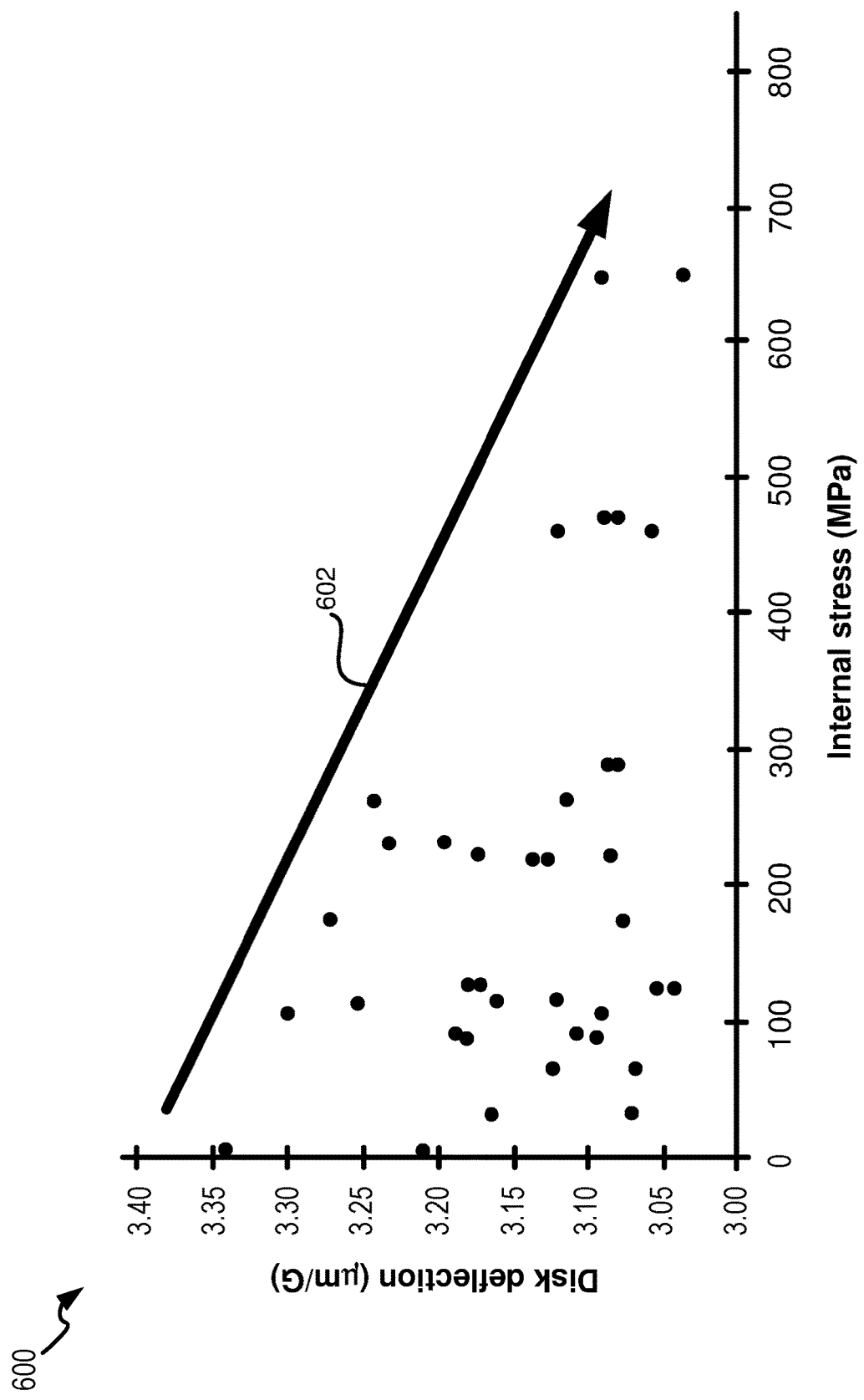
FIG. 6 is a graph illustrating outer diameter (OD) disk deflections as a function of internal stress in accordance with aspects of the disclosure.

FIG. 6 is a graph illustrating OD disk deflections as a function of internal stress. The horizontal X-axis shows increasing internal stress in MPa from zero to over 600 MPa. The vertical Y-axis shows OD disk deflections (for a 0.5 mm disk with a diameter of 97 mm) in μm/G (i.e., the amount of up or down deflection exhibited by the OD of a horizontal disk mounted to a spindle and subjected to one G-force). As shown in the figure, the amount of deflection decreases with increasing internal stress. Arrow 602 shows that the amount of maximum defection generally decreases with increasing internal stress. It is noted that, for at least some disks with low internal stress, relatively little deflection occurs (as shown in the lower left-hand portion of the graph). However, other disks with those internal stress levels exhibit deflections of far greater magnitude (as shown in the upper left-hand portion of the graph). Hence, as a practical matter, disks with low internal stress are not well-suited to use in HDDs since at least some of the disks with that level of internal stress may exhibit large deflections in response to mechanical shocks, which may result in damage to the HDD, as already explained. By selecting and using disks with high internal stress (e.g., greater than 300 MPa for a 0.5 mm disk with a 97 mm diameter), the maximum deflections are generally much lower and hence there is less risk of HDD damage.

Note that disks with high internal stress are more suitable to be positioned at the bottom or top of a disk stack than in the middle (see, FIG. 15, discussed below) since the disc deflection is usually larger due to the differences of the clamping surfaces. In this regard, the bottom disk may be on a shoulder of a motor hub while the top disk is a top-clamp disk (instead of flat spacers). Even though the initial internal stress may be lower than 300 MPa, if clamping distortion itself gives stress, which can be measured as flatness changes, its disk deflection can be suppressed. Note also that disk flatness with a clamp is mostly independent of the original flatness (with no clamping force), at least up to 20 μm or so.

Figure 7:
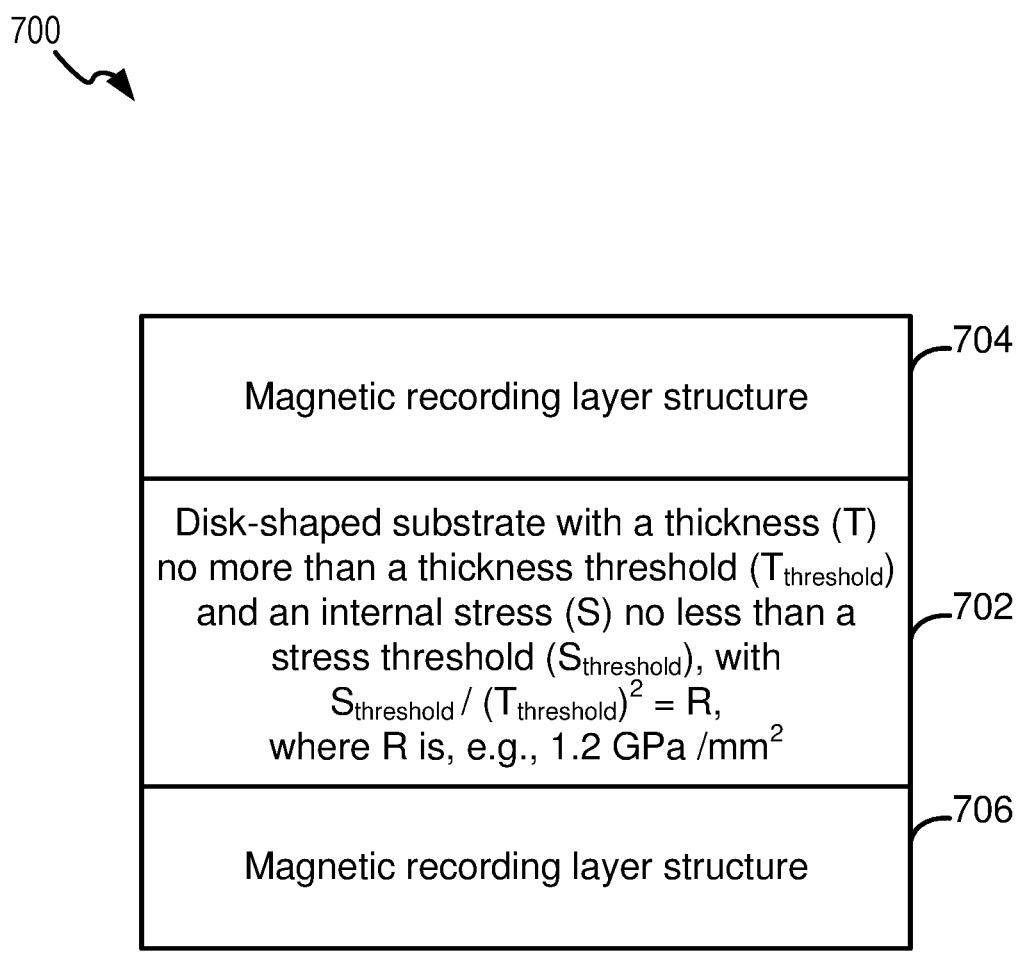
FIG. 7 illustrates an exemplary magnetic recording medium in the form of a pre-stressed disk having a thickness and an internal stress conforming to various thresholds in accordance with an embodiment of the disclosure.

FIG. 7 illustrates, in simplified form, an exemplary magnetic recording medium, platform or structure in the form of a pre-stressed disk 700 having a substrate 702, a first magnetic recording layer structure 704 deposited on one side surface (e.g., the top surface), and a second magnetic recording layer structure 706 deposited on the other side surface (e.g., the bottom surface). The substrate 702 has a thickness (T) no more than a thickness threshold ($T_{threshold}$) and an internal stress (S) no less than a stress threshold $S_{threshold}$, where $S_{threshold}/(T\ threshold)^2=R$, and where R is a predetermined ratio that is, e.g., 1.2 GPa/mm². In one example where R is 1.2 GPa per mm², $S_{threshold}$ is 300 MPa, $T_{threshold}$ is no more than 0.5 mm, and the internal stress S is in the range of 300 MPa to 600 MPa. In another example where R is also 1.2 GPa per mm², $S_{threshold}$ is 240 MPa and $T_{threshold}$ is no more than 0.45 mm, the internal stress is in the range of 240 MPa to 600 MPa (e.g., 240 MPa). Thus, a thinner disk (e.g., 0.45 mm) can have an internal stress lower than the internal stress of a thicker disk (e.g., 0.5 mm), while still achieving satisfactory rigidity. As noted above, the ratio (R) is based on the stress being roughly proportional to the thickness squared.

Figure 8:
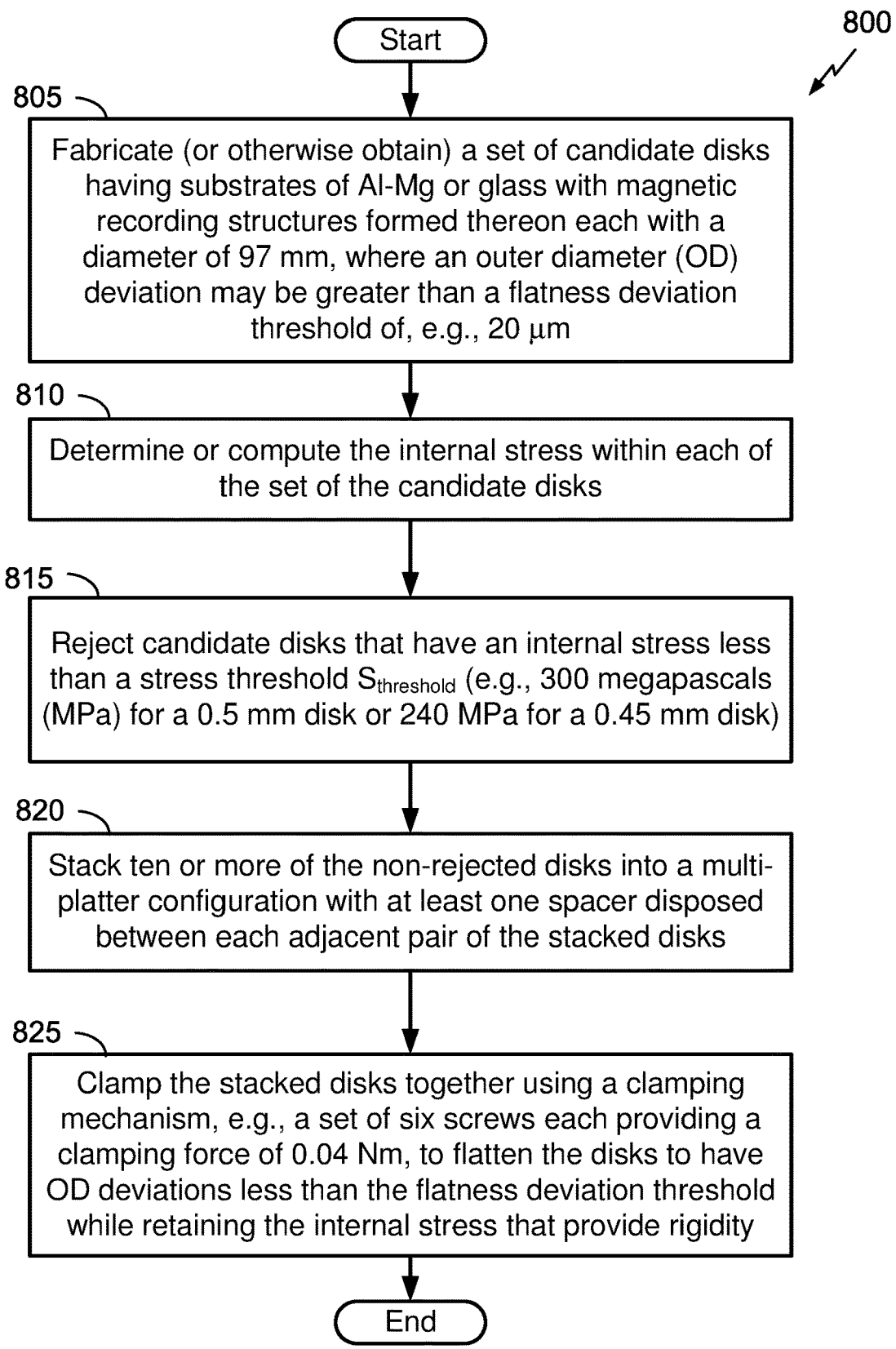
FIG. 8 illustrates an exemplary method for selecting suitable disks for use in a clamped multi-platter HDD based on internal stress within the disks in accordance with an embodiment of the disclosure.

FIG. 8 illustrates a method 800 for selecting suitable disks for use in a clamped multi-platter HDD based on internal stress within the disks. At block 805, a fabrication or selection system or apparatus fabricates or selects a set of candidate disks having substrates of Al—Mg or glass with magnetic recording structures formed thereon (e.g., the disks of FIGS. 3 and 4, described above), with each disk having a diameter of 97 mm, where the OD deviation may be greater than a flatness deviation threshold of, e.g., 20 µm. As explained above, high internal stress within thin disks may cause the thin disks to deform or warp, resulting in significant OD deviation. Note that, in other examples, the substrate may include other suitable materials such as zinc or combinations of glass, aluminum, magnesium, and/or zinc.) Note that disks may be purchased or otherwise acquired or obtained, and then processed by the system.

At block 810, the system determines or computes (or looks up from a database) the internal stress within each of the set of the candidate disks. For example, the system may measure the thickness (T) of a candidate disk, which may be, e.g., 0.5 mm, and then apply the formula $S=R*T^2$ or other suitable formulae to estimate the internal stress (S) within the candidate disk using $R=1.2$ GPa/mm$^2$ or other values in the range of 0.96 GPa/mm$^2$ to 1.44 GPa/mm$^2$, i.e., 1.2 GPa per mm$^2$±20%. In some examples, the system (or operators controlling or programming the system) selects, chooses or otherwise determines a particular value for R within that range so that the formula may then be applied using the particular value for R. Otherwise routine experimentation may be employed to determine or select particular values for R within the range based, for example, on an analysis of particular compounds within the substrate. In some examples, the system may look up pre-stored internal stress values for different disk thickness values from a table. Still further, if equipped with a suitable device for measuring internal stress, the device may be applied to the candidate disk to measure the stress. Depending upon the material, exemplary non-destructive techniques for measuring internal stress include, for example, strain gauge techniques, X-ray diffraction, magnetic-elastic techniques, neutron diffraction methods, and ultrasound methods. Those skilled in the art can select among those or other suitable techniques based on the materials of the disk.

At block 815, the system rejects candidate disks that have an internal stress less than a stress threshold $S_{threshold}$ (e.g., 300 MPa for a 0.5 mm thick disk or 240 MPa for a 0.45 mm thick disk). Note here that, whereas some fabrication or selection procedures or systems might reject disks having significant OD deviations because the disks are considered too warped or deformed to be useful, the system and procedure of FIG. 8 does not reject such disks. Indeed, a significant OD deviation is a further indication that the thin disk has high internal stress. At block 820, the system stacks ten or more of the non-rejected disks into a multi-platter configuration with at least one spacer disposed between each adjacent pair of the stacked disks. At block 825, the system clamps the stacked disks together using a clamping mechanism, e.g., a set of six screws each providing a clamping torque of 0.04 Nm, to flatten the disks to have OD deviations less than the flatness deviation threshold while retaining the internal stress that provides rigidity. As already explained, thin disks with high internal stress are likely to be deformed, yet by clamping a stack of such disks together (which will generally have random deformations, e.g., some convex, some concave, etc.), the disks are collectively flattened out while retaining their high internal stress and thus retaining the rigidity associated with that stress.

Although FIG. 8 illustrates an example where all disks having internal stress below the threshold are rejected, in other examples, such disks may be retained and used as the inner disks of a multi-platter stack (e.g., as in FIG. 15). Still further, in some examples, if the internal stress is determined to be less than 300 MPa, flatness of the disk under clamping is measured. If the flatness is between 5 to 20 µm, internal stress due to clamping is deemed sufficient to increase the rigidity. As such, a disk with stress less than, e.g., 100 MPa may still be used in less critical positions within a disk stack such as middle section. The top and bottom disk are the most affected by g forces, therefore disks with high internal stress should be used at those positions. See, FIG. 15, discussed below.

Figure 9:
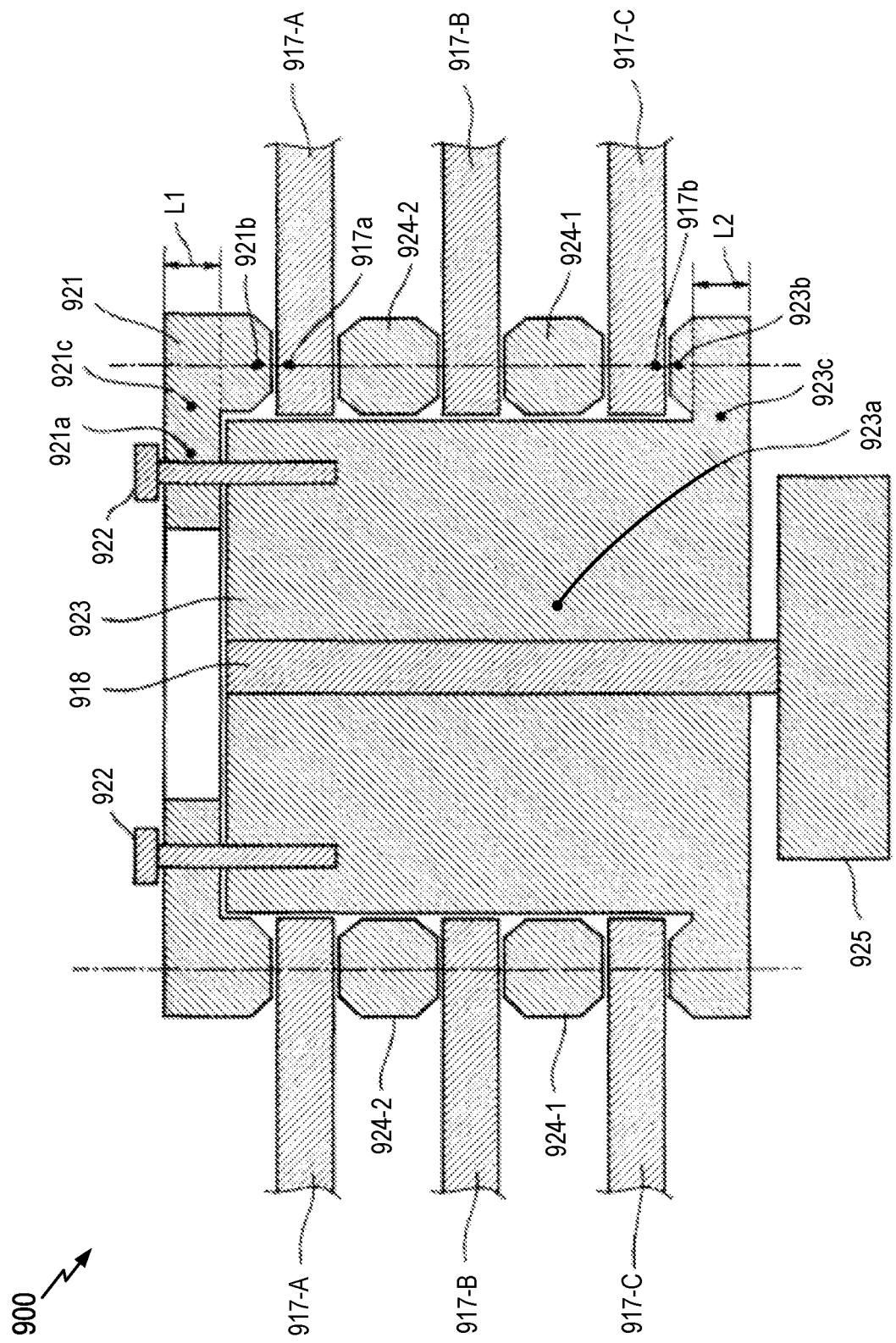
FIG. 9 illustrates a cross-sectional view of an exemplary multi-platter magnetic recording structure having a stack of pre-stressed disks on a spindle in accordance with an embodiment of the disclosure.

FIG. 9 is a cross-sectional view showing sub-components of a data storage device 900 including multiple recording disks (e.g., each including a substrate with a thickness of no more than 0.5 millimeters (mm) and an internal stress no less than (i.e. greater than or equal to) 300 MPa) in accordance with an aspect of the present disclosure. In this example, the media (recording disks) include three recording disks 917-A, 917-B, and 917-C, collectively referred to as recording disks 917, with magnetic recording layers provided adjacent their respective top and bottom surfaces. In other examples, ten or more of the disks may be stacked, as explained above.

The recording disks 917 are stacked and secured to a hub 923, which is coupled to a spindle shaft 918. In an aspect, the top and bottom surfaces of each disk of the recording disks 917 may individually be used as information recording surfaces, and an individual magnetic head on a slider (e.g., slider 108 in FIGS. 1 and 2) is used for each surface. Moreover, each recording disk 917 may include a NiP plating layer, as discussed above, as well as a recording layer structure. Individual disks are rotated together with the hub 923 and spindle shaft 918, which may be rotated by a spindle motor 925. In the following descriptions, for case of explanation, the spindle motor 925 is described as a rotational shaft type that rotates the spindle shaft 918 according to some aspects, however, a stationary shaft type that does not rotate the spindle shaft 918 may also be used in other aspects.

The hub 923 may have a cylindrical shape/portion 923a. The recording disks 917 may each have a central hole or central opening configured to fit on the cylindrical portion 923a of the hub 923. The hub 923 also includes a perimetric portion 923b and a connecting portion 923c that extends outwardly from the cylindrical portion 923a. The perimetric portion 923b supports the lowermost recording disk 917-C. A first ring-shaped spacer 924-1 is disposed on top of recording disk 917-C. Recording disk 917-B is on top of first ring-shaped spacer 924-1, and a second-ring shaped spacer 924-2 is disposed on top of recording disk 917-B. Recording disk 917-A is on top of second-ring shaped spacer 924-2. In FIG. 9, the assembly 900 includes three recording disks 917 and two spacers. In other aspects, the assembly 900 (e.g., data storage device) may have more than or less than three recording disks, and more than or less than two spacers, for example, ten disks with nine spacers.

The recording disks 917 may be secured to the hub 923 by a top clamp 921 placed at the top of the hub 923, and therefore, may secure recording disk 917-A, with a downward force opposing the upward force/support provided by the perimetric portion 923b of the hub 923, from an upper portion of the data storage device 900. The top clamp 921 and the hub 923 may be secured together using one or more screws 922, each providing a torque of 40 cNm, which may also secure the recording disks 917 to the spindle shaft 918. For example, if six screws 922 are used, then the screws 922 may be disposed at intervals of 60 degrees, dividing the angle of 360° degrees of the circumference of a recording disk 917 into six parts. As already explained, the clamping force flattens out the disks to reduce deformations arising within the thin disks during disk fabrication, while the disks retain their high internal stress so as to retain the rigidity associated with the high internal stress, to minimize OD deflections.

In some aspects, the hub 923 may be made of stainless steel. However, the hub 923 may also be made of aluminum or an aluminum alloy according to some other aspects. In an aspect, the top clamp 921 may be made of stainless steel, for example. The clamping force may be obtained from a tightening force used to tighten the screws 922 that presses on a clamp portion 917a of disk 917-A and a clamp portion 917b of disk 917-C, in part from the perimetric portion 923b, and thereby secure the disks 917 to the hub 923 at upper and lower portions of the data storage device. The hub 923 is secured to the spindle shaft 918, which is the axis of rotation of the spindle motor 925. The top clamp 921 is secured by tightening the screws 922 into the hub 923. As shown in FIG. 9 and described above, the ring-shaped spacers 924-1 and 924-2, collectively referred to as 924, (e.g., made of a ceramic material, composite material, polymer, and/or metal alloy) are inserted in the spaces among the three recording disks 917-A. 917-B, and 917-C.

A radius of the cylindrical portion 923a of the hub 923 that passes through center holes of the recording disks 917-A, 917-B, and 917-C may be smaller than a radius of a perimetric portion 923b which holds the recording disk 917-C from the lower portion of the data storage device 900. Likewise, a radius at which screwing positions 921a are disposed in the top clamp 921 may be smaller than a radius of a perimetric portion 921b which holds the recording disk 917-A from the upper portion of the data storage device 900. The screwing positions 921a and the perimetric portion 921b of the top clamp 921 may be integrally formed in a stainless-steel member (e.g., top clamp 921), and the thickness of a connecting portion 921c may be L1. The cylindrical portion 923a and the perimetric portion 923b of the hub 923 may also be integrally formed in a stainless-steel member, and the thickness of a connecting portion 923c may be L2.

Additional Examples and Embodiments

Figure 10:
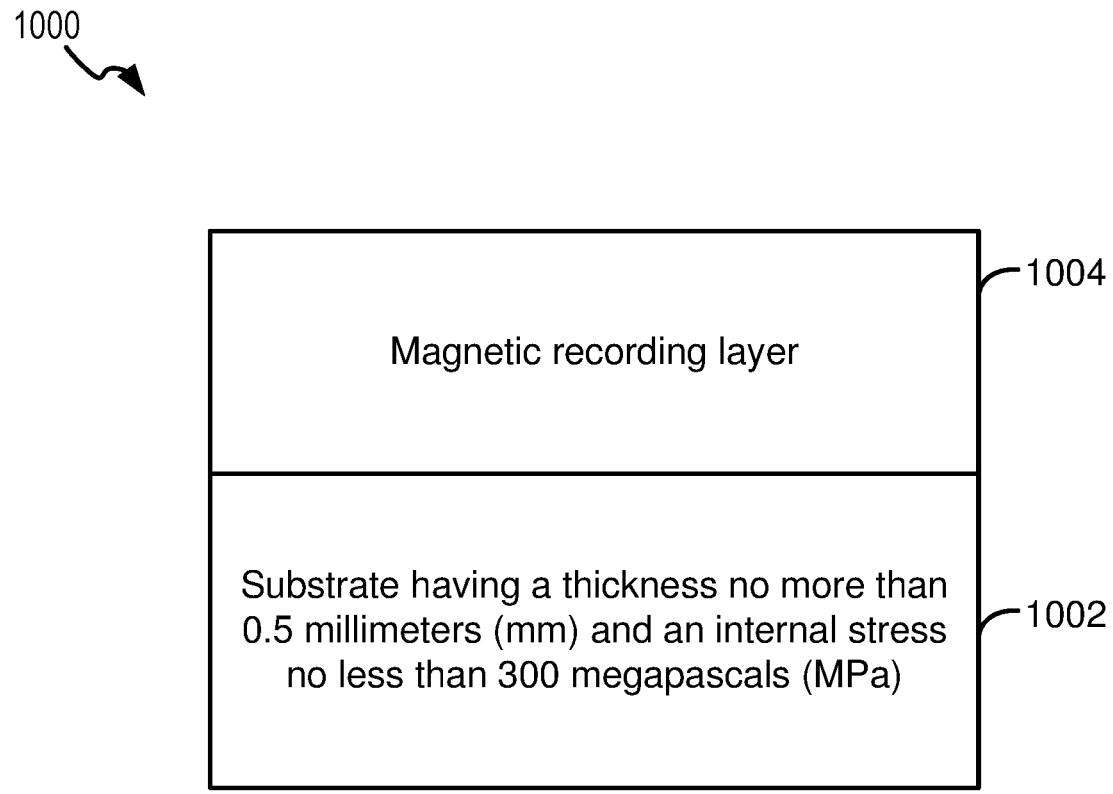
FIG. 10 illustrates another exemplary magnetic recording medium in the form of a pre-stressed disk in accordance with an embodiment of the disclosure.

FIG. 10 illustrates an exemplary disk 1000 for use in a magnetic recording apparatus. The disk 1000 includes a substrate 1002 having a thickness no more than (i.e., less than or equal to) 0.5 mm and an internal stress no less than (i.e. greater than or equal to) 300 MPa. The disk 1000 also includes a magnetic recording layer 1004 on the substrate. In some examples, additional layers or coatings may be provided, including layers between the substrate and the magnetic recording layer. Further details of exemplary disks are provided above.

Figure 11:
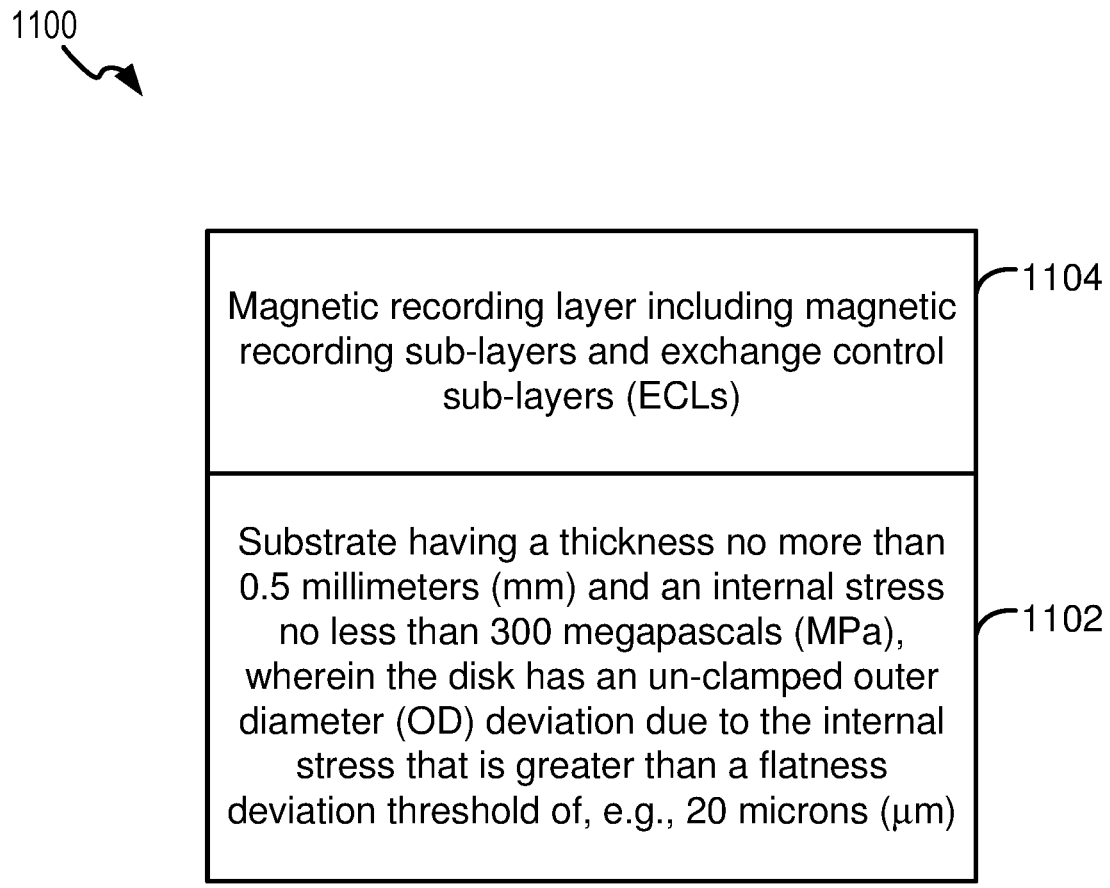
FIG. 11 illustrates yet another exemplary magnetic recording medium in the form of a pre-stressed disk in accordance with an embodiment of the disclosure.

FIG. 11 illustrates an exemplary disk 1100 for use in a magnetic recording apparatus. The disk 1100 includes a substrate 1102 having a thickness no more than (i.e., less than or equal to) 0.5 mm and an internal stress no less than (i.e. greater than or equal to) 300 MPa, wherein the disk has an un-clamped OD deviation due to the internal stress that is greater than a flatness deviation threshold of, e.g., 20 µm. The disk 1100 also includes a magnetic recording layer 1104 on the substrate including magnetic recording sub-layers and exchange control sub-layers (ECLs). In some examples, additional layers or coatings may be provided, including layers between the substrate and the magnetic recording layer. Further details of exemplary disks are provided above.

Figure 12:
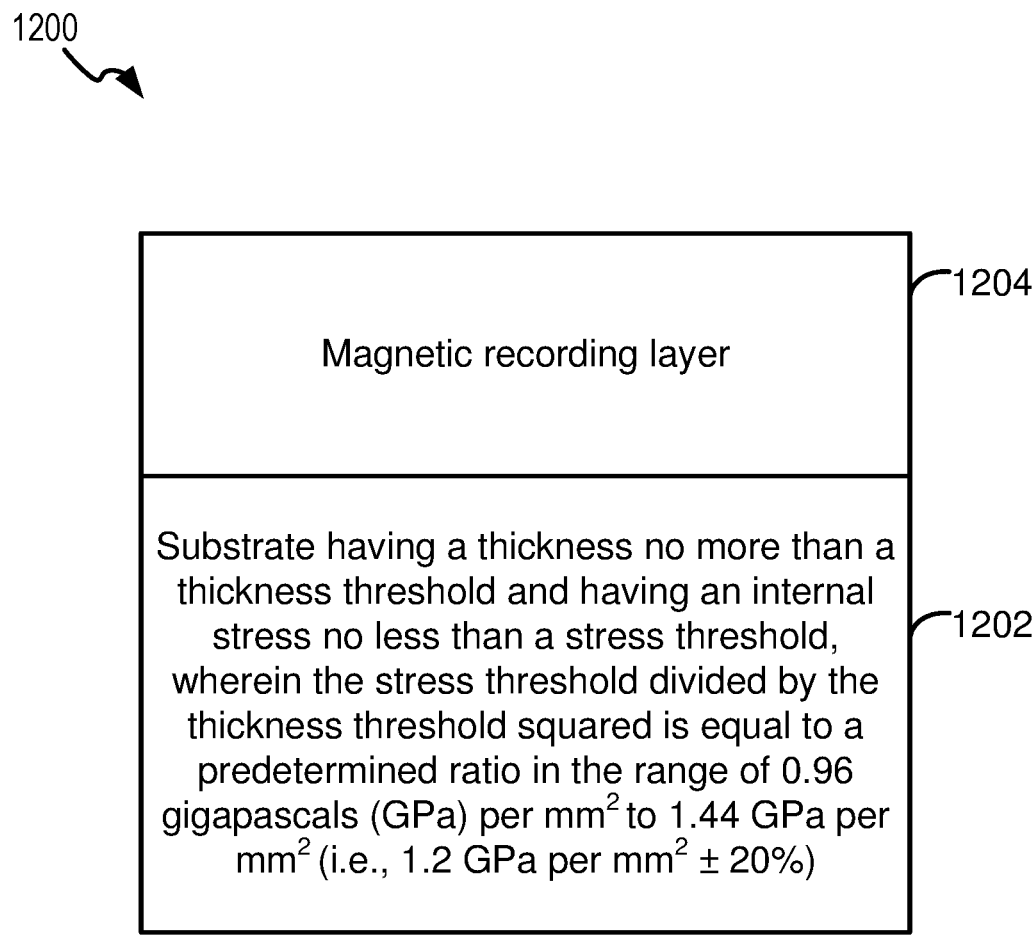
FIG. 12 illustrates still yet another exemplary magnetic recording medium in the form of a pre-stressed disk in accordance with an embodiment of the disclosure.

FIG. 12 illustrates an exemplary disk 1200 for use in a magnetic recording apparatus. The disk 1200 includes a substrate 1202 having a thickness no more than (i.e., less than or equal to) a thickness threshold and having an internal stress no less than (i.e. greater than or equal to) a stress threshold, wherein the stress threshold divided by the thickness threshold squared is equal to a predetermined ratio in the range of 0.96 GPa per mm$^2$ to 1.44 GPa per mm$^2$. i.e., 1.2 GPa per mm$^{2+20}$%. In the example of FIG. 12, the disk 1200 also includes a magnetic recording layer 1204 on the substrate. In some examples, additional layers or coatings may be provided, including layers between the substrate and the magnetic recording layer. Further details of exemplary disks are provided above.

Figure 13:
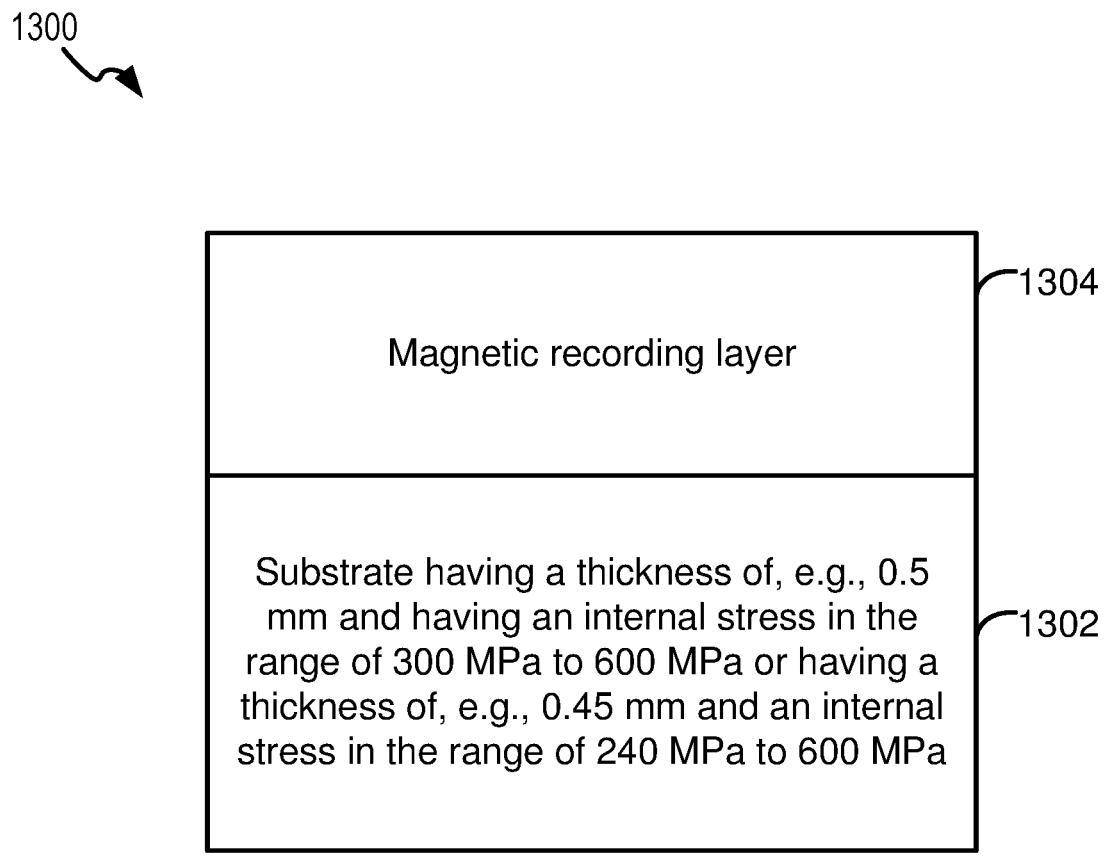
FIG. 13 illustrates a still further exemplary magnetic recording medium in the form of a pre-stressed disk in accordance with an embodiment of the disclosure.

FIG. 13 illustrates an exemplary disk 1300 for use in a magnetic recording apparatus. The disk 1300 includes a substrate 1302 having a thickness of, e.g., 0.5 mm and having an internal stress in the range of 300 MPa to 600 MPa or having a thickness of, e.g., 0.45 mm and an internal stress in the range of 240 MPa to 600 MPa. In some examples, additional layers or coatings may be provided, including layers between the substrate and the magnetic recording layer. Further details of exemplary disks are provided above.

Figure 14:
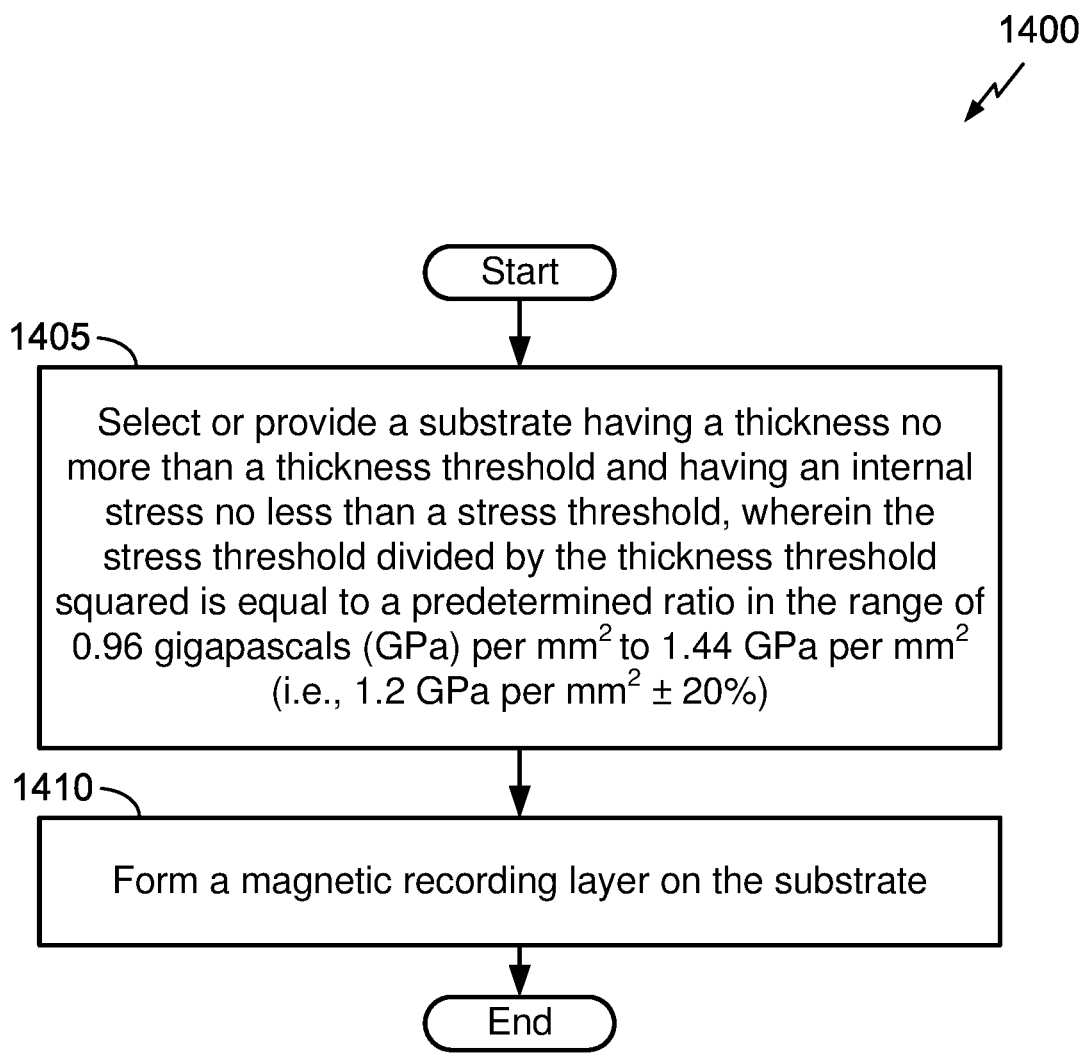
FIG. 14 illustrates an exemplary method for selecting suitable disks for use in a clamped multi-platter HDD based on internal stress within the disks in accordance with an embodiment of the disclosure.

FIG. 14 illustrates an exemplary method 1400 for providing a disk for a magnetic recording apparatus. The method 1400 includes, in block 1405, selecting or providing a substrate having a thickness no more than (i.e., less than or equal to) a thickness threshold and having an internal stress no less than (i.e. greater than or equal to) a stress threshold, wherein the thickness threshold and the stress threshold are such that the stress threshold divided by the thickness threshold squared is equal to a predetermined ratio in the range of 0.96 GPa per mm$^2$ to 1.44 GPa per mm$^2$, i.e., 1.2 GPa per mm$^2$±20% (and, in an illustrative example, the ratio is 1.2 GPa per mm$^2$). The method also includes, in block 1410, forming (e.g., depositing) a magnetic recording layer on the substrate. In some examples, additional layers or coatings may be formed, including layers between the substrate and the magnetic recording layer. Further details of exemplary methods are provided above.

Figure 15:
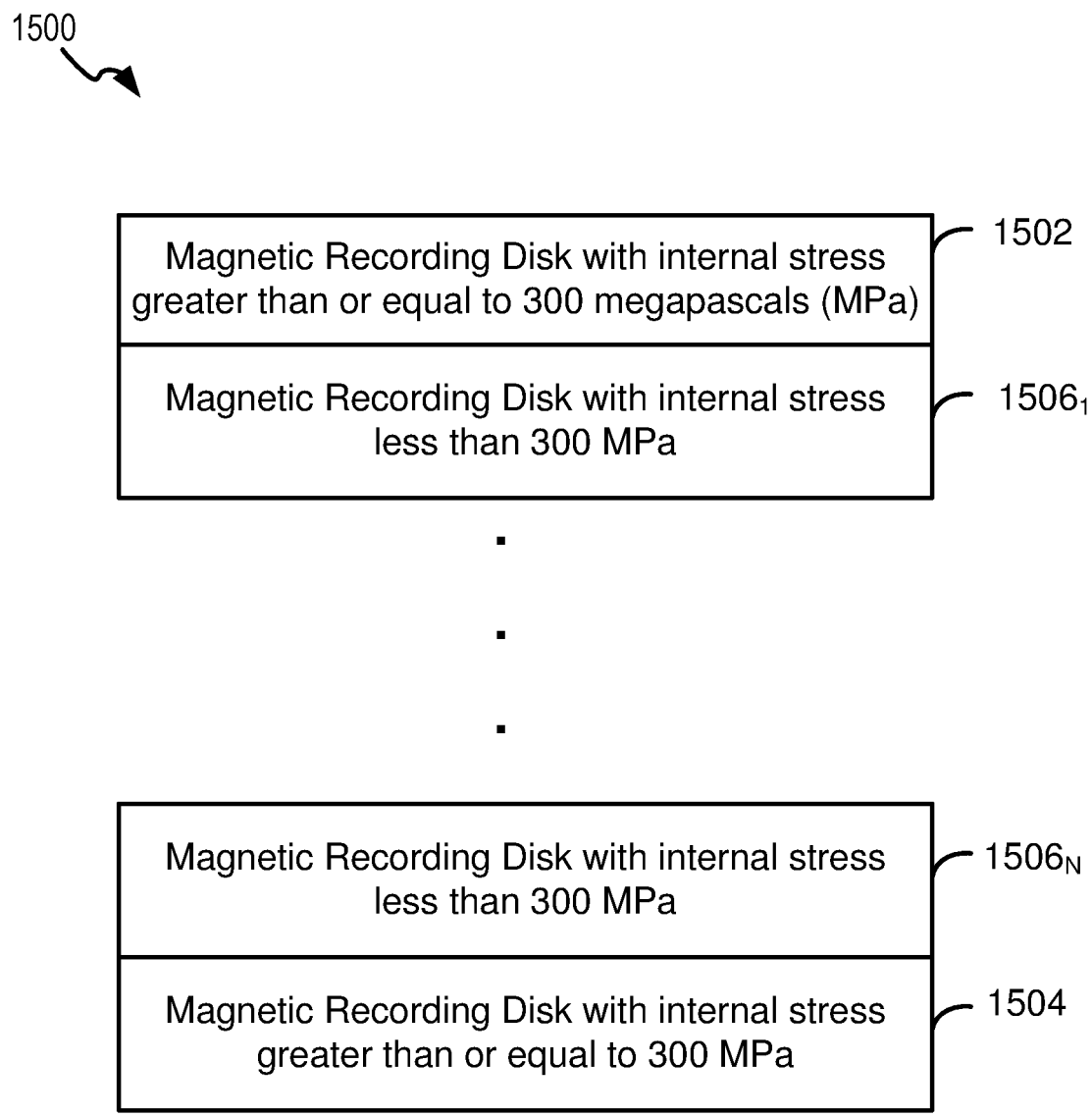
FIG. 15 illustrates an exemplary multi-platter magnetic recording disk structure having a stack of disks in accordance with an embodiment of the disclosure, wherein a pair of outer disks have a higher internal stress than the inner disks of the stack.

FIG. 15 illustrates an exemplary stack of disks 1500 for use in a magnetic recording apparatus where some of the disks have different levels of internal stress than other disks. The stack 1500 includes a pair of upper and lower outer disks 1502 and 1504, which each have an internal stress greater than or equal to 300 MPa, and a set of inner disks $1506_1$-$1506_N$, which each have an internal stress less than 300 MPa (e.g., 100 MPa). Each of the disks of the stack 1500 may, for example, have a thickness of 0.5 mm and a diameter of 97 mm. Thus, FIG. 15 illustrates that one or more disks of a stack may have an internal stress less than a stress threshold (e.g., <300 MPa), whereas one or more other disks in the same stack may have an internal stress greater than or equal to the stress threshold (e.g., ≥300 MPa). As already explained, in other examples, other stress thresholds are appropriate, such as a threshold of 240 MPa for use with 0.45 mm disks. As noted above, during a hot swap, bumps to a server can impart shocks to the drives that are operating. The top disk and bottom disk of a multi-platter drive typically deflect more than the inner disks in response to a shock. Therefore, disks with higher internal stress (e.g. ≥300 MPa) can be used as the inner and outer disks (1502 and 1504), whereas disks with less stress (1506$_1$-1506$_N$) may be used in the other disk positions.

FIG. 16 illustrates an exemplary substrate 1600 for use in a magnetic recording apparatus. The substrate 1600 has (a) a thickness less than or equal to a thickness threshold and an internal stress greater than or equal to a stress threshold, wherein the stress threshold divided by the thickness threshold squared is equal to a predetermined ratio in the range of 0.96 to 1.44 GPa/mm$^2$ and/or the substrate 1600 (b) has a thickness less than or equal to 0.5 mm and an internal stress greater than or equal to 300 MPa. In some examples, layers or coatings may be provided on the substrate, including the above-described magnetic recording layer (or layers), as well as various layers between the substrate and a magnetic recording layer. In some examples, the substrate has an un-clamped OD deviation due to the internal stress that is greater than a flatness deviation threshold, wherein, e.g., the flatness deviation threshold is 20 μm. In some examples, the substrate includes or consists of Al—Mg alloy or includes or consists a glass material that has been subjected to a temperature over 600° C. Further details of exemplary substrates are provided above.

Additional Aspects and Considerations

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

What is claimed is:

1. An apparatus, comprising:
   a plurality of magnetic recording disks in a stacked configuration including:
   a first magnetic recording disk having a thickness less than or equal to 0.5 millimeters (mm) and an internal stress greater than or equal to 300 megapascals (MPa);
   a second magnetic recording disk having a thickness less than or equal to 0.5 mm and an internal stress less than 300 MPa; and
   a third magnetic recording disk having a thickness less than or equal to 0.5 mm and an internal stress greater than or equal to 300 MPa;
   wherein the second magnetic recording disk is between the first magnetic recording disk and the third magnetic recording disk;
   wherein at least one spacer is in contact with and disposed between each adjacent pair of the magnetic recording disks of the plurality of magnetic recording disks; and
   wherein the plurality of the magnetic recording disks are clamped together by a clamping mechanism that comprises:
   a perimeter portion of a hub that is in contact with the first magnetic recording disk; and
   a perimeter portion of a top clamp that is in contact with the third magnetic recording disk.

2. The apparatus of claim 1, wherein at least one of the first and third magnetic recording disks has an un-clamped outer diameter (OD) deviation that is greater than a flatness deviation threshold.

3. The apparatus of claim 2, wherein the flatness deviation threshold is 20 microns (μm).

4. The apparatus of claim 1, wherein at least one of the plurality of magnetic recording disks comprises a substrate and a magnetic recording layer, and wherein the substrate comprises an aluminum-magnesium (Al—Mg) alloy, and wherein a nickel-phosphorous (NiP) coating layer is between the substrate and the magnetic recording layer.

5. The apparatus of claim 4, wherein the substrate of at least one of the first and third magnetic recording disks comprises a glass material that has been subjected to a temperature over 600° Celsius (C).

6. The apparatus of claim 1, wherein the plurality of magnetic recording disks further comprises at least seven additional magnetic recording disks between the second magnetic recording disk and the third magnetic recording disk, each of the additional magnetic recording disks having a thickness less than or equal to 0.5 mm and an internal stress less than 300 MPa.

7. The apparatus of claim 1, wherein the second magnetic recording disk has an internal stress less than 100 MPa.

8. An assembly of disks for use in a magnetic recording apparatus, comprising:
   a first magnetic recording disk having a thickness less than or equal to 0.5 millimeters (mm) and an internal stress greater than or equal to 300 megapascals (MPa);

a plurality of second magnetic recording disks, each having a thickness less than or equal to 0.5 mm and an internal stress less than 300 MPa; and a third magnetic recording disk having a thickness less than or equal to 0.5 mm and an internal stress greater than or equal to 300 MPa;

wherein the first magnetic recording disk, the plurality of second magnetic recording disks, and the third magnetic recording disk are in a stacked configuration; and wherein the plurality of second magnetic recording disks are between the first magnetic recording disk and the third magnetic recording disk.

9. The assembly of disks of claim 8, wherein the first magnetic recording disk and the third magnetic recording disk each has an un-clamped outer diameter (OD) deviation greater than 20 microns (μm).

10. The assembly of disks of claim 8, wherein each of the plurality of second magnetic recording disks has an internal stress less than 100 MPa.

11. The assembly of disks of claim 8, wherein the plurality of second magnetic recording disks comprise at least seven magnetic recording disks.

12. A data storage device comprising:

the assembly of disks of claim 8, wherein at least one spacer is in contact with and disposed between each adjacent pair of the magnetic recording disks of the assembly of disks; and wherein the assembly of disks is clamped together by a clamping mechanism.

13. The data storage device of claim 12, wherein the clamping mechanism comprises:

a perimeter portion of a hub that is in contact with the first magnetic recording disk; and a perimeter portion of a top clamp that is in contact with the third magnetic recording disk.

* * * * *